(12) United States Patent
Goering (10) Patent No.: US 9,962,901 B2
(45) Date of Patent: May 8, 2018

(54) PREFORM WITH INTEGRATED GAP FILLERS

(71) Applicant: Albany Engineered Composites, Inc., Rochester, NH (US)

(72) Inventor: Jonathan Goering, York, ME (US)

(73) Assignee: Albany Engineered Composites, Inc., Rochester, NH (US)

( * ) Notice: Subject to any disclaimer, the term of this patent is extended or adjusted under 35 U.S.C. 154(b) by 0 days. days.

(21) Appl. No.: 15/388,421

(22) Filed: Dec. 22, 2016

(65) Prior Publication Data

US 2017/0190138 A1    Jul. 6, 2017

Related U.S. Application Data

(60) Provisional application No. 62/274,620, filed on Jan. 4, 2016.

(51) Int. Cl.
| | |
|---|---|
| *B32B 5/02* | (2006.01) |
| *B32B 3/04* | (2006.01) |
| *D03D 25/00* | (2006.01) |
| *B32B 5/06* | (2006.01) |
| *B32B 5/26* | (2006.01) |

(52) U.S. Cl.
CPC ............... *B32B 3/04* (2013.01); *B32B 5/024* (2013.01); *B32B 5/06* (2013.01); *B32B 5/26* (2013.01); *D03D 25/005* (2013.01); *B32B 2250/20* (2013.01); *B32B 2260/023* (2013.01); *B32B 2260/046* (2013.01); *B32B 2262/0253* (2013.01); *B32B 2262/0269* (2013.01); *B32B 2262/101* (2013.01); *B32B 2262/105* (2013.01); *B32B 2262/106* (2013.01); *B32B 2605/00* (2013.01); *D10B 2101/06* (2013.01); *D10B 2101/08* (2013.01); *D10B 2101/12* (2013.01); *D10B 2321/021* (2013.01); *D10B 2331/021* (2013.01); *D10B 2505/12* (2013.01); *D10B 2505/20* (2013.01)

(58) Field of Classification Search
CPC ...... Y10T 428/24174; B32B 3/04; B32B 5/26
USPC ......................................................... 428/119
See application file for complete search history.

(56) References Cited

U.S. PATENT DOCUMENTS 6,446,675 B1    9/2002   Goering

FOREIGN PATENT DOCUMENTS

| EP | 2 210 733 A1 | 7/2010 |
|---|---|---|
| EP | 2 540 479 A1 | 1/2013 |

OTHER PUBLICATIONS

International Search Report and Written Opinion prepared by the European Patent Office, acting as the ISA, for international application PCT/US2016/068279 dated Mar. 30, 2017.

*Primary Examiner* — Alexander Thomas
(74) *Attorney, Agent, or Firm* — McCarter & English, LLP (57) ABSTRACT

A three-dimensional gap-filled preform and a method of forming a three-dimensional gap-filled preform. The preforms comprise a base section of all integrally woven layers, a portion of that base separated into three sections, the outer two sections comprising integrally woven layers, and the middle section comprising an integrated gap filler. The integrated gap filler may comprise a center section of one woven layer, independently woven layers, integrally woven layers, or a plurality of layers of warp fibers that are not interwoven with weft fibers. The layers of the integrated gap filler compress or crumple up in the middle section and fill the formed gap or gaps, while the woven layers of the outer sections are folded to form the shape of the preform.

36 Claims, 4 Drawing Sheets

PREFORM WITH INTEGRATED GAP FILLERS

BACKGROUND

1. Field of the Disclosure

This disclosure generally relates to three-dimensional (3D) woven preforms and particularly relates to 3D woven preforms used in reinforced composite materials. More particularly, the present disclosure relates to preforms that can be formed into a "T" shape. More particularly still, the present disclosure relates to preforms that can be formed into a "T" shape with formed gaps that are filled with integrated material.

2. Related Art

The use of reinforced composite materials to produce structural components is now widespread, particularly in applications where their desirable characteristics of light weight, high strength, toughness, thermal resistance, and ability to be formed and shaped can be used to great advantage. Such components are used, for example, in aeronautical, aerospace, satellite, high performance recreational products, marine, and other applications.

Typically, such components consist of reinforcement materials embedded in a matrix material. The reinforcement component may be made from materials such as glass, carbon, ceramic, aramid, polyethylene, and/or other materials which exhibit desired physical, thermal, chemical and/or other properties, chief among which is great strength against stress failure. These materials are often fabricated into fibers and used as reinforcing fibers, or the fibers are formed into yarns which are used as reinforcing yarns in the component.

Through the use of such reinforcement materials, which ultimately become a constituent element of a completed component, the desirable characteristics of the reinforcement materials, such as very high strength, are imparted to the completed composite component. The typical constituent reinforcement materials may be woven, knitted, braided, laminated or otherwise oriented into desired configurations for reinforcement preforms. In many cases, particular attention is paid to ensure the optimum utilization of the properties for which the constituent reinforcing materials have been selected. Usually such reinforcement preforms are combined with matrix material to form desired finished components or to produce working stock for the ultimate production of finished components.

After the desired reinforcement preform has been constructed, a resin or matrix material may be introduced to and into the preform, so that typically the reinforcement preform becomes encased in the matrix material and matrix material fills the interstitial areas between the constituent elements of the reinforcement preform. The matrix material may be any of a wide variety of materials, such as epoxy, bismaleimide, polyester, vinyl-ester, ceramic, carbon and/or other materials, which also exhibit desired physical, thermal, chemical and/or other properties. The materials chosen for use as the matrix may or may not be the same as that of the reinforcement preform and may or may not have comparable physical, chemical thermal or other properties. Typically, however, they will not be of the same materials or have comparable physical, chemical, thermal, or other properties, since a usual objective sought in using composites in the first place is to achieve a combination of characteristics in the finished product that is not attainable through the use of one constituent material alone. So combined, the reinforced preform and the matrix material may then be cured and stabilized in the same operation by thermosetting or other known methods, and then subjected to other operations toward producing the desired component. It is significant to note at this point that after being so cured, the then solidified masses of the matrix material normally are very strongly adhered to the reinforcing material (e.g., the reinforcement preform). As a result, stress on the finished component, particularly via its matrix material acting as an adhesive between fibers, may be effectively transferred to, and borne by, the constituent material of the reinforcement preform. Any break or discontinuity in the reinforcement preform limits the ability of the preform to transfer and bear the stress applied to the finished component.

In certain applications, three dimensional (3D) woven composite structures are desired as primary load carrying members. One useful shape of a preform for such members is generally referred to as a "T" preform, so called because it resembles the letter T in an axial view. Other useful preforms may have different cross sectional shapes, such as Pi ($\pi$), H, I, or L for example. Fiber preforms with specific structural shapes can be woven on a conventional shuttle loom, and several existing patents describe the method of weaving such structures.

One of the drawbacks of the use of these preforms is that they form gaps when they are bifurcated or divided. These gaps are usually filled according to conventional methods by adding additional material to the preform. But filling the gap with added material removes the overall continuity of the preform. Further, requiring the addition of new material adds labor, materials, and cost to the preform manufacture. Finally, the added material is not integrally connected to the preform, which reduces the structural integrity of the preform.

To maintain the structural integrity of the preform, in many cases the addition of reinforcements is required at the gap. The reinforcement is often in the form of sheets of material, typically additional woven material. The additional reinforcement creates a localized increase in thickness and weight of the preform. The reinforcement may create a localized weight concentration in the reinforced gap itself.

Other known methods may require mechanical fasteners, for example, bolts or rivets, to affix the reinforcement to the preform at the gap. However, the use of metal bolts or rivets at the interface of such components is often unacceptable because such fasteners require through holes which further compromise the integrity of the composite structure. Detrimentally, fasteners add weight and introduce different coefficients of thermal expansion as between such elements and the surrounding material.

Prior art methods have not adequately addressed the need for 3D woven preforms able to be formed into gap fillers without the addition of other materials and the resultant increase in localized thickness and additional weight. The present disclosure addresses the shortcomings of the prior art by providing a 3D woven preform with its gaps filled with integrated material without the need for additional material with an associated increase in localized thickness additional weight and decrease in structural integrity.

SUMMARY OF THE DISCLOSURE

Accordingly, the present disclosure relates to a 3D woven preform and a method of making a 3D woven preform with gaps filled by integrated material without requiring the input of additional material. The gap of the preform is formed by folding two arms of a divided woven structure in a substantially planar fashion, thereby forming a gap in between the two folded arms. In this disclosure the terms "3D" and "multilayer" are used interchangeably. Additionally, in this disclosure the term "gap-filled" is used to describe a 3D woven preform with gaps filled by integrated material.

The terms "threads", "fibers", and "yarns" are used interchangeably in the following description. "Threads", "fibers", and "yarns" as used herein can refer to monofilaments, multifilament yarns, twisted yarns, multifilament tows, textured yarns, braided tows, coated yarns, bicomponent monofilament yarns, as well as yarns made from stretch broken fibers or any other such materials. The term "panel" as used herein can refer to any structural or material component that sets into another component. The term "base" as used herein can refer to the vertical or lengthwise portion of the preform which can be cut and/or formed into a shaped preform.

The term "integrally woven" as used herein refers to fiber layers that are interwoven between layers. The term "independently woven" as used herein refers to fiber layers that are not interwoven between layers. The terms "top," "bottom," "vertical," and "horizontal" are used herein for convenience in describing the preform and are not to be construed as limiting the preform or its orientation.

The present disclosure also relates to a reinforced composite structure comprising a 3D woven preform which can be formed into a gap-filled preform without requiring additional fabric or matrix materials.

One embodiment of the present disclosure is a three-dimensional (3D) woven preform having a plurality of woven layers. The woven preform includes a base section of the preform with integrally woven layers. At least one end portion of the base section of the preform is separated into at least three sections including at least one middle section, and at least two outer sections having integrally woven layers. The at least two outer sections are folded to form a shape of the preform, and the at least one middle section is compressed or crumpled in a gap formed between the at least two outer sections.

Another embodiment of the present disclosure relates to a 3D woven preform that is a multi-layered fabric including one or more lengthwise portions having an all-layer woven interlock of fabric and one or more lengthwise portions having two or more independently woven interlocking layers of fabric and one or more separated layers of woven fabric. The separated layers are located between the interlocking layers of fabric. The two or more interlocking layers of fabric are folded away from each other, forming one or more gaps in between the interlocking layers. The separated layers are between the interlocking layers and in the embodiment, are formed into a compressed state in the gaps.

The 3D woven preform may contain at least one gap that is substantially triangular in shape. Additionally, the 3D woven preform may be in the cross-sectional shape of a "T", "L", "H", "I", or "Pi" ("π").

The 3D woven preform may be formed by cutting (or bifurcating) the preform along the lengthwise portion of the preform into three sections. Further, the 3D woven preform may be woven such that there are two integrally woven sections on the outside (which eventually form the top of the "T"), and a center layer which can be one woven layer, a series of independently woven layers, a series of integrally woven layers, or layers of warp yarns that are not interwoven with weft yarns.

Furthermore, both ends of the 3D woven preform may be bifurcated. Alternatively, one end of the 3D woven preform may be bifurcated and one end the 3D woven preform may be woven such that the preform is Pi-shaped with a clevis in between its legs.

Furthermore, there may be at least two of the 3D woven preforms fixed or woven side-by-side such that when in use, two adjacent sides of the two preforms form a gap in between the vertical portions (bases) of the "T" shape, for instance, for insertion of a metal or composite panel that may be a wall or bulkhead in an aircraft fuselage for example. These at least two side-by-side preforms may be the same as the embodiments above, or different.

The specifications of the 3D woven preforms (e.g., leg lengths, ratio of leg lengths to base lengths, yarn dimensions, thickness, number of integrally or independent woven layers) may vary.

The 3D woven preform may contain warp and weft fibers or yarns that are made from material such as glass, carbon, ceramic, aramid, polyethylene, or other suitable material. The 3D woven preform may also be a reinforced composite structure comprising a matrix material such as epoxy, bismaleimide, polyester, vinyl-ester, ceramic, carbon, or other material known to those in the art.

Additionally, the present disclosure relates to a method of forming a 3D woven preform. Warp yarns or fibers are woven with weft yarns or fibers to form a multi-layered fabric including one or more lengthwise portions having an all-layer woven interlock of fabric and one or more lengthwise portions having two or more independently woven interlocking layers of fabric and one or more separated woven layers of fabric. The separated layers are located between the interlocking layers of fabric. The preform may be cut through in one or more places such that the one or more cuts divides the preform into segments of independently woven interlocking layers with separated layers positioned between the interlocking layers. The preform is folded along the projection of the plane of said cuts such that two or more of said interlocking layers are folded in directions opposite from each other, forming one or more gaps between said interlocking layers. In a T-preform, the folded areas are substantially coplanar. The yarns of the separated layers are compressed between the interlocking layers in the gaps. The preform can be impregnated with a matrix material to become a composite.

As one alternative embodiment, the preform is woven such that the center layers are woven with a pattern of weft yarns such that the center layers are not attached to the outer integrally woven layers. The center layers may be just one woven layer, may be independently woven from each other if there is more than one layer, or all layers may be integrally woven together.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the disclosure.

BRIEF DESCRIPTION OF THE DRAWINGS

The following detailed description, given by way of example, but not intended to limit the disclosure solely to the specific embodiments described, may best be understood in conjunction with the accompanying drawings, in which like references denote like or similar elements and parts, and in which.

DETAILED DESCRIPTION

Embodiments of the disclosure are described below with reference to the accompanying drawings which depict embodiments of the disclosed preform and exemplary applications thereof. However, it is to be understood that applications of the disclosed preform is not limited to those embodiments illustrated. Also, the disclosure is not limited to the depicted embodiments and details thereof, which are provided for purposes of illustration and not limitation.

The present disclosure relates to three-dimensional (3D) woven preforms that can be formed into shaped preforms with integrated gap fillers without the addition of separate or additional materials at the gap and a method of forming such preforms. Other configurations of 3D preforms are possible. That is, the present technique may be applied to preforms having a gap formed from the folding of portions of the preform. In particular, such gaps may result when woven portions of the fabric are formed into legs of the preform.

Figure 1A:
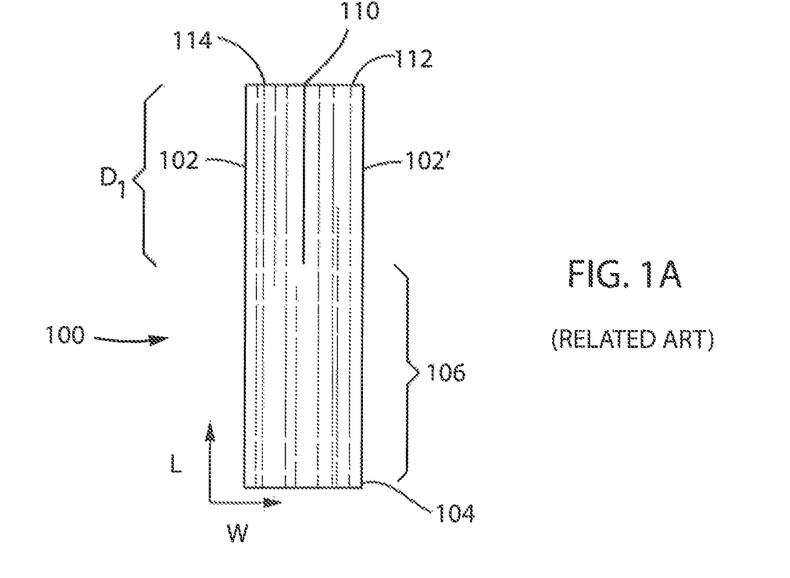
FIGS. 1A-1B illustrate a side view of the formation of a prior art 3D woven preform in the shape of a "T" preform made from a bifurcating multilayer interlocking fabric.
Figure 1B:
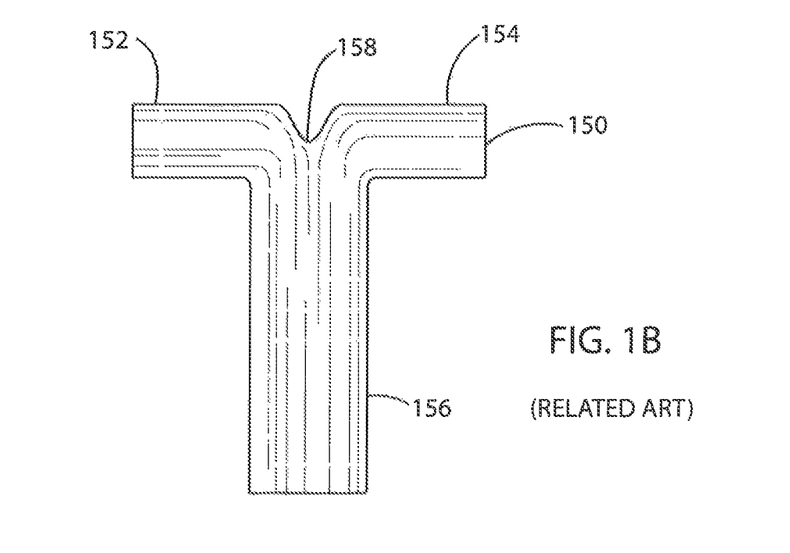

FIGS. 1A-1B illustrate formation of a 3D woven T-preform of the related art. In FIG. 1A, planar structure 100, comprises a substantially planar major surface 102 and a generally parallel opposite major surface 102', and at least one edge surface 104. A base section 106 along the longitudinal length of the preform structure 100 is comprised of a plurality of integrally woven layers. Another section 108 of planar structure 100 is cut 110 into first segment 112 and second segment 114. Cut 110 is made through a depth $D_1$ of preform structure 100 at the location of the cut to the major surface 102. The plane of cut 110 is perpendicular to preform structure 100 and structure major surface 102 at the location of the cut.

In FIG. 1A, structure 100 is formed of two portions. The base section 106 is formed of one or more integrally woven layers 112 and one or more integrally woven layers 114 of warp and weft yarns, the layers being woven together across the entire width of the structure. In a second end portion of structure 100 layers 112 are not woven together with layers 114 along a bifurcation 110. Alternatively, layers 112 and 114 may be integrally woven together and separated by cutting along bifurcation 110 along the length of the structure 100.

Dimensional relationships between segments 112, 114, and $D_1$ influence the characteristics of the formed gap 158.

FIG. 1B illustrates a T-shaped preform 150, resulting from folding segments 112 and 114 along the bifurcation 110 from FIG. 1A in a substantially planar fashion to form a left arm 152 and a right arm 154. At least one base portion 156 along the longitudinal length of the preform 150 is comprised of a plurality of integrally woven layers. A gap 158 is formed by folding the arm 152 and the arm 154 in a substantially planar fashion to form a T-shaped preform 150 by cutting the preform along the L axis. Gap 158 results from the inherent radii formed from the folding of the arms 152, 154. Gap 158 is substantially triangular shaped. Such gaps can be filled so the preform presents a substantially planar surface. Also gaps such as 158 if not filled may result in a weakness in the preform.

Figure 2A:
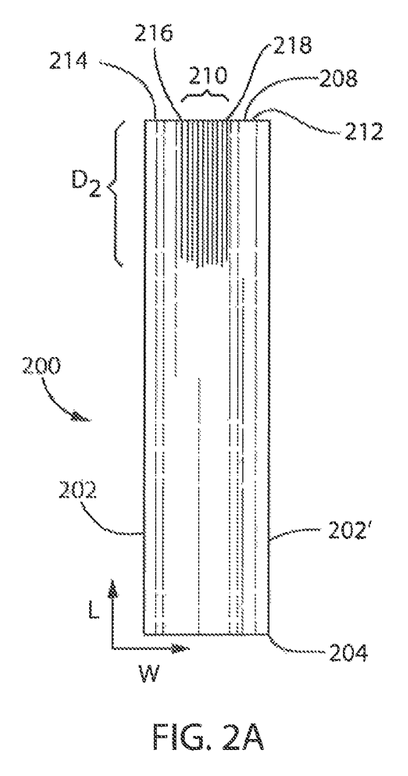
FIGS. 2A-2C illustrate a side view of the formation of a 3D woven preform in the shape of a "T" preform according to an embodiment of the disclosure.

FIG. 2 illustrates a 3D woven T-preform according to an embodiment of this disclosure. In FIG. 2A, structure 200 comprises a major surface 202 and a generally parallel opposite surface 202', and at least one corner 204. At least one end portion 206 along a longitudinal length of the preform structure 200 is comprised of a plurality of integrally woven layers. End portion 208 is divided by bifurcations 216 and 218, thereby forming three segments 210, 212, 214 of end portion 208. Bifurcations 216 and 218 are made through a depth $D_2$ of preform structure 200 and may be substantially equal in depth. The plane of bifurcations 216 and 218 may be perpendicular to preform structure 200 and structure major surface 202 at the location of each bifurcation. Portion 210 is at least one layer of nonwoven warp and weft fibers that exists between bifurcations 216 and 218.

In embodiments of the present disclosure, segments 212 and 214 have the same depth $D_2$ and are of the same length or substantially the same length, along the length L of the structure. In some embodiments, bifurcation cuts 216, 218 are of different depths.

Other dimensional relationships between segments 212, 214 may influence the characteristics of the formed gap(s) 258, 260. Embodiments of the present disclosure can be achieved by using binder picks during the weaving of the structure. Along the appropriate section(s) of the structure, binder picks are omitted, allowing a bifurcation to be formed when the separate arms of the preform are folded open.

Figure 2B:
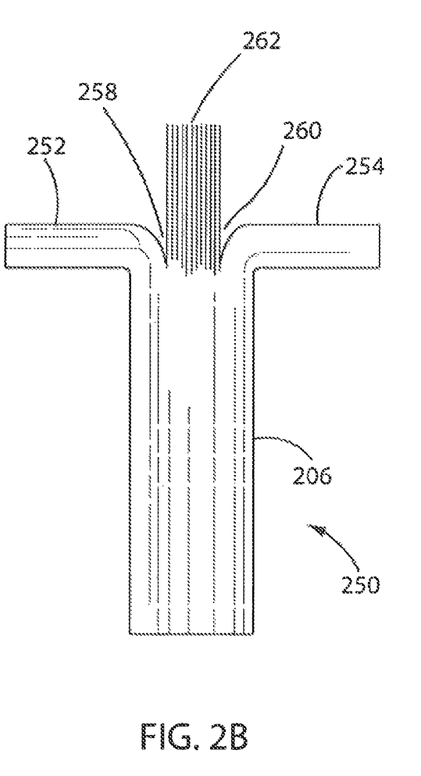

FIG. 2B illustrates a T-preform 250, which results from folding segments 212 and 214 along bifurcations 216 and 218 in a substantially planar fashion to form a left arm 252 and a right arm 254. At least one base portion 206 along the longitudinal length of the preform 250 is comprised of a plurality of integrally woven layers. Two gaps 258 and 260 are formed by folding the arms 252 and 254 in a substantially planar fashion to form a T-preform 250. Independently woven separated fiber layers 262 remain between arms 252 and 254 and gaps 258 and 260. As discussed above, the depth of bifurcations 216, 218 can affect the gap(s) 258, 260 and the relative lengths of arms 252, 254. That is, a greater depth of a bifurcation will enable a greater length of a resultant arm.

Figure 2C:
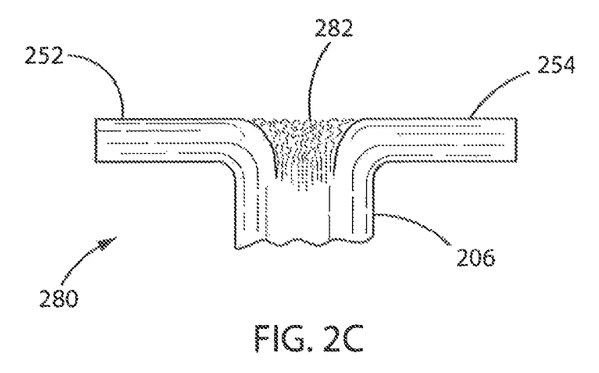

FIG. 2C illustrates a T-shaped preform 280, which is the resulting product from compressing or crumpling the independently woven separated fiber layers 262 from FIG. 2B downward to fill gaps 258 and 260 to form a substantially coplanar top surface 284 of the perform with the arms 252, 254. The resulting structure, including the filled gap 282 may be infused with resin or matrix material, such as, but not limited to, epoxy, bismaleimide, polyester, vinyl-ester, ceramic, carbon, or other materials which exhibit desired physical, thermal, chemical, or other properties, using conventional techniques such as, but not limited to, resin transfer molding or chemical vapor infiltration, resulting in a reinforced composite structure. The resulting T-preform 280 has arms 252 and 254, which are in a substantially coplanar arrangement and are connected by the filled gap 282.

An embodiment of the present disclosure is directed to a 3D woven preform comprised of a first portion of a first section of the preform having layers of warp fibers not woven with weft fibers, a second portion of a first section of the preform having warp and weft fibers integrally interwoven into one or more layers on a first side of the first portion, and a third portion of the first section having warp and weft fibers integrally interwoven into one or more layers on an opposite side of the first portion. The second and third portions are folded to form a shape of the T-preform, and the unwoven layers of warp fibers are compressed or crumpled in a gap formed between the second and third portions. Further, in a second section of the preform the warp and weft fibers of the first section are woven into layers. Additionally, the layers of the first, second, and third portions in the second base section are all interwoven together.

Another embodiment of the present disclosure is directed to a 3D woven preform comprised of a first lengthwise section having warp and weft fibers integrally woven into layers at least some of which are interlocking and a second lengthwise section having two or more portions, each of the two or more portions including warp and weft fibers integrally woven into interlocking layers, and having one or more portions of non-woven warp fibers. The non-woven portion is positioned between the portions of interlocking layers and two or more of the portions of interlocking layers are folded to form one or more gaps between said folded portions of interlocking layers. Further, the non-woven portion is crumpled in the formed gaps. A further embodiment is directed to a preform having two portions of interlocking layers. An additional embodiment is directed to a preform having two portions of interlocking layers that are folded to form a T-preform and with non-woven warp fibers crumpled in the gap formed between the two portions of folded interlocking layers.

The surface of the folded parts of the two portions of interlocking integrally woven layers may be substantially coplanar. The warp and weft fibers or yarns may be made from any suitable material such as, but not limited to, glass, carbon, ceramic, aramid, and polyethylene. The preform may be in the form of a composite that has been impregnated by a matrix material. The matrix material may fill the entire structure, including the gap so that a top surface of the gap is substantially coplanar with the folded parts of the two portions of interlocking layers. The matrix material may be any suitable material such as, but not limited to, epoxy, bismaleimide, polyester, vinyl-ester, ceramic, and carbon.

Another embodiment of the present disclosure is directed to a method of forming a three-dimensional (3D) woven preform having a plurality of integrally woven layers. The method involves forming a first portion of a first section of the preform having warp fibers not woven with weft fibers, forming a second portion of a first section of the preform having warp and weft fibers interwoven into one or more layers on a first side of the first portion, and forming a third portion of the first section having warp and weft fibers interwoven into one or more layers on an opposite side of the first portion. The method then involves folding the second and third portions to form a shape of the preform, and crumpling the unwoven fibers in a gap formed between the second and third portions. The method may involve forming a second section of the preform by integrally weaving warp and weft fibers of the first section into layers. The method may also involve integrally weaving the layers of the first, second, and third portions in the second section together.

An additional embodiment of the present disclosure is directed to a method of forming a three-dimensional (3D) woven preform having a plurality of woven layers comprising the steps of weaving a first lengthwise section having warp and weft fibers into layers at least some of which are interlocking, integrally weaving a second lengthwise section having two or more portions, each of the two or more portions including warp and weft fibers of interlocking layers, and having one or more portions of non-woven warp fibers, positioning the non-woven portion between the portions of interlocking layers, folding two or more of the portions of interlocking layers to form one or more gaps between said folded portions of interlocking layers, and crumpling the non-woven portion in the formed gaps. The method may involve forming two portions of interlocking layers. The method may also involve folding the two portions of interlocking layers to form a T-preform and crumpling the non-woven fibers in the gap between the two portions of folded interlocking layers. The method may include making a surface of the folded parts of the two portions of interlocking layers that is substantially coplanar. Further, the method may include using warp and weft fibers or yarns made from any suitable material, including but not limited to, glass, carbon, ceramic, aramid, and polyethylene.

Another embodiment of the present disclosure is directed to a method of manufacturing a composite comprising a method of manufacturing a 3D woven preform structure with two arms and a gap therebetween wherein said gap is filled with material integral to the woven preform, and by impregnating a matrix material into the preform. The method may include filling the entire structure, including the formed gap with a matrix material so a top surface of the gap is substantially coplanar with the folded parts of the two portions of interlocking layers. The method may also utilize any matrix material, including but not limited to, epoxy, bismaleimide, polyester, vinyl-ester, ceramic, and carbon.

Another embodiment of the present disclosure is directed to a method of manufacturing a 3D woven preform comprised of cutting any of the previous preforms both at the top end and the bottom end and separating the top end and bottom end into at least three sections.

Figure 3A:
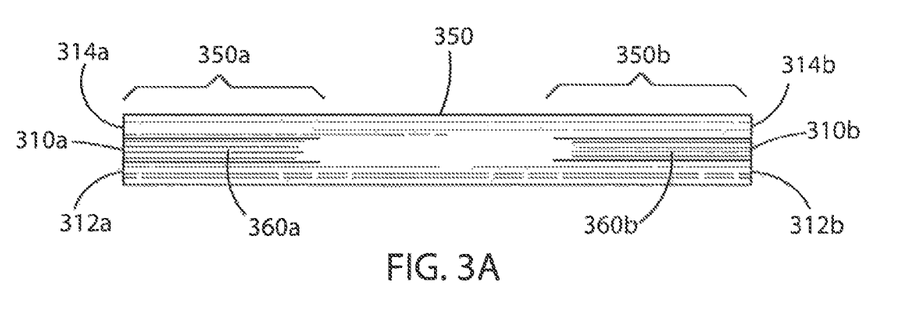
FIG. 3A-3B illustrates a 3D woven H-shaped preform according to an embodiment of the disclosure.
Figure 3B:
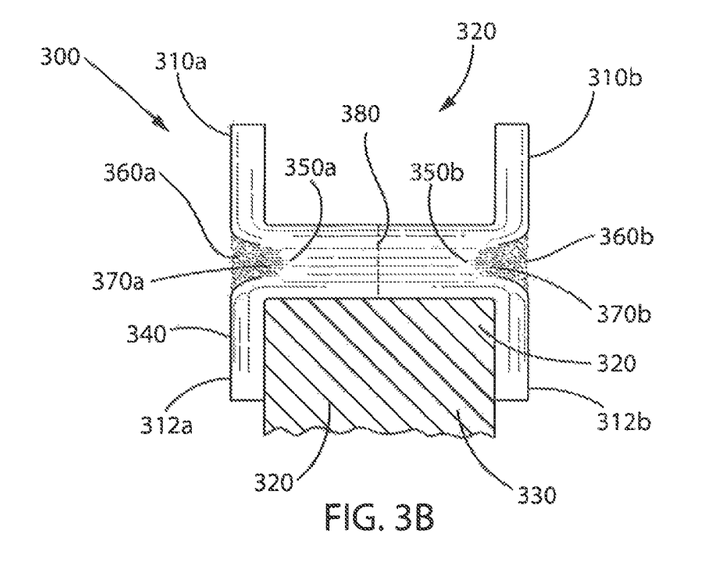

FIGS. 3A-3B illustrate an embodiment of the present disclosure directed to a 3D woven preform formed into an H-shaped (or I-shaped) preform 300. H-shaped preform is comprised of any of the previously described preforms wherein both a first end portion 350a and a second end portion 350b of the 3D woven preform 350 are each separated into at least three sections. First end portion 350a is separated into sections 310a, 312a, 314a and second end portion 350b is separated into sections 310b, 312b, and 314b. As described herein above, each of the first and second end portions is folded over forming respective clevis or gaps 370a, 370b there between. Fibers 360a, 360b of the non-woven center portions 310a, 310b are crumpled in the gaps 370a, 370b forming substantially parallel planar surfaces. Gaps 320 result from the formed H-preform. The preform may be impregnated as discussed herein. Gaps 320 can be used for mounting, for example, a panel 330, glass, plexiglass, or other object.

Alternatively, an H-shaped (or I-shaped) preform 300 can be formed from two T-preforms 310a, 310b. In this embodiment, T-preforms 310a, 310b are joined at their bases at a point 380. Any method of joining the T-preforms known to those of ordinary skill, such as bonding, etc., can be used.

Figure 4:
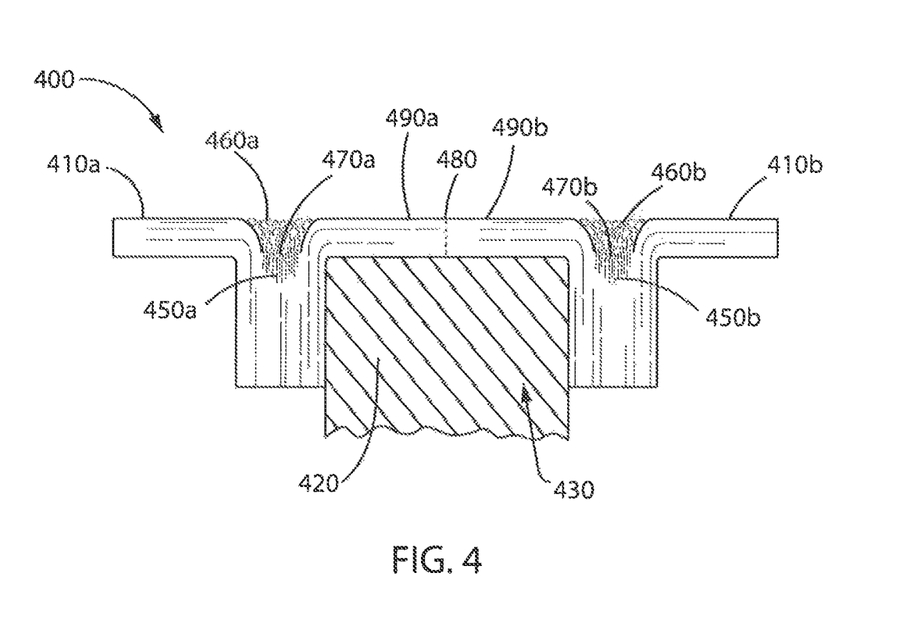
FIG. 4 illustrates a 3D woven Pi-shaped preform according to an embodiment of the disclosure.

FIG. 4 illustrates an embodiment of the present disclosure is directed to a 3D woven preform formed into a Pi-shaped preform 400. In this embodiment two T-preforms 410a, 410b are woven by any of the methods discussed herein above. As described herein above, each of the first end portions 450a, 450b is folded over forming respective gaps 470a, 470b there between. T-Preforms 410a, 410b can be disposed adjacent one another thereby forming Pi-preform 400 with clevis or gap 420 between them. The T-preforms can be joined together at respective flange ends 490a, 490b by any known method at a location 480. Fibers 460a, 460b of the non-woven center portions are crumpled in the gaps 470a, 470b forming substantially parallel planar surfaces along the top surface of the resultant Pi-preform. Clevis or gap 420 results from the formed Pi-preform. The preform may be impregnated as discussed herein. Gap 420 can be used for mounting, for example, a panel 430, glass, plexiglass, or other object.

Another embodiment of the present disclosure is directed to a method of manufacturing a 3D woven preform comprised of weaving two of the previous preforms adjacent to each other thereby forming a clevis between them.

An embodiment of the present disclosure is directed to a 3D woven preform comprised of any of the previous preforms wherein the top end of the 3D woven preform is separated into at least three sections and the bottom end of the 3D woven preform is woven such that the preform is Pi-shaped ("π").

Another embodiment of the present disclosure is directed to a method of manufacturing a 3D woven preform comprised of cutting any of the previous preforms both at the top end of the 3D woven preform thereby separating the top end into at least three sections and weaving the bottom end of the 3D woven preform such that the preform is Pi-shaped ("π").

Other embodiments are within the scope of the following claims.

I claim:

1. A three-dimensional (3D) woven preform having a plurality of woven layers, the woven preform comprising:
    a base section of the preform comprising integrally woven layers;
    at least one end portion of the base section of the preform separated into at least three sections comprising:
    at least one middle section;
    at least two outer sections comprising integrally woven layers;
    wherein the at least two outer sections are folded to form a shape of the preform, and the at least one middle section is compressed or crumpled in a gap formed between the at least two outer sections.

2. The preform of claim 1, wherein the at least three sections are formed by cutting the at least one portion of the base.

3. The preform of claim 1, wherein the at least three sections are formed by weaving the at least one end portion of the base.

4. The preform of claim 1, wherein binder picks are used to weave the preform and are omitted at the sides of the at least one end portion of the base enabling a bifurcation to be formed when the separate arms of the preform are folded open.

5. The preform of claim 1, wherein the at least one middle section comprises one or more independently woven layers.

6. The preform of claim 1, wherein the at least one middle section comprises two or more integrally woven layers.

7. The preform of claim 1, wherein the at least one middle section comprises warp fibers not woven with Weft fibers.

8. The preform of claim 1, wherein the at least two outer sections are folded to form a T-preform.

9. The preform of claim 8, wherein the folded at least two outer sections form a substantially coplanar top surface.

10. The preform of claim 9, wherein matrix material fills the gap so a top surface of the gap is substantially coplanar with the folded at least two outer sections.

11. The preform of claim 10, wherein the matrix material is selected from the group consisting of epoxy, bismaleimide, polyester, vinyl-ester, ceramic, and carbon.

12. The preform of claim 1, wherein at least two of the 3D woven preforms are fixed side-by-side such that at least two adjacent sides of the at least two 3D woven preforms form a gap between their bases.

13. The preform of claim 12, wherein a panel is inserted in between the gap formed between the at least two 3D woven preform bases.

14. The preform of claim 12, wherein the at least two 3D woven preforms are T-preforms woven together to form a clevis in between the T-preforms.

15. The preform of claim 1, wherein both the first end and the second end of the 3D woven preform is separated into at least three sections.

16. The preform of claim 1, wherein a first end portion of the 3D woven preform is separated into at least three sections and a second end portion of the 3D woven preform is woven such that the preform is Pi-shaped ("Π").

17. The preform of claim 1, wherein the warp and weft fibers or yarns are made from a material selected from the group consisting of glass, carbon, ceramic, aramid, and polyethylene.

18. A composite comprising:
    a preform according to claim 1; and
    a matrix material impregnating the preform.

19. A method of forming a three-dimensional (3D) woven preform having a plurality of woven layers comprising:
    forming a first portion of a base having integrally woven layers; and
    forming at least one end portion of the base having at least three sections, the at least three sections including:
    at least one middle section; and
    at least two outer sections having integrally woven layers; and
    folding the at least two outer sections to form a shape of the preform; and
    compressing or crumpling the at least one middle section in a gap formed between the at least two outer sections.

20. The method of claim 19, wherein the at least three sections are formed by cutting the at least one end portion along a length (L) of the base.

21. The method of claim 19, wherein the at least three sections are formed by weaving the at least one end portion of the base.

22. The method of claim 19, wherein binder picks are used in weaving the preform and the at least three sections are formed by omitting binder picks at the sides of the middle portion of the base enabling a bifurcation to be formed when the separate arms of the preform are folded open.

23. The method of claim 19, wherein one or more layers of the at least one middle section are independently woven.

24. The method of claim 19, wherein two or more layers of the at least one middle section are integrally woven.

25. The method of claim 19, wherein the at least one middle section comprises warp fibers not woven with weft fibers.

26. The method of claim 25, comprising:
    folding the at least two outer sections to form a T-preform; and
    compressing or crumpling the non-woven fibers in the gap between the at least two outer sections.

27. The method of claim 26, wherein a surface of the folded parts of the at least two outer sections are substantially coplanar.

28. The method of claim 27, wherein matrix material is filled in the gap so a top surface of the gap is made substantially coplanar with the folded parts of the at least two outer sections.

29. The method of claim 28, wherein the matrix material is selected from the group consisting of epoxy, bismaleimide, polyester, vinyl-ester, ceramic, and carbon.

30. The method of claim 19, wherein at least two of the 3D woven preforms are fixed side-by-side such that at least two adjacent sides of the at least two 3D woven preforms form a clevis in between their bases.

31. The method of claim 30, wherein a panel is inserted in between the clevis formed between the at least two 3D woven preform bases.

32. The method of claim 30, wherein the at least two 3D woven preforms are formed into a Pi-shape ("Π").

33. The method of claim 19, wherein both the top end and the bottom end of the 3D woven preform is separated into at least three sections.

34. The method of claim 19, wherein a first end portion of the 3D woven preform is separated into at least three sections and a second end portion of the 3D woven preform is woven such that the preform is Pi-shaped ("Π").

35. The method of claim 19, wherein the warp and weft fibers or yarns are made from a material selected from the group consisting of glass, carbon, ceramic, aramid, and polyethylene.

36. A method of manufacturing a composite comprising:
forming a preform according to the method of claim 19; and
impregnating the preform with a matrix material.

* * * * *